US005244218A

United States Patent [19]

Irwin, Sr.

[11] Patent Number: 5,244,218

[45] Date of Patent: Sep. 14, 1993

[54] WASTE CONTAINER HAVING ORIENTED COMPARTMENTS

[76] Inventor: John C. Irwin, Sr., P.O. Box 482, Rancho Cucamonga, Calif. 91729-0482

[21] Appl. No.: 733,856

[22] Filed: Jul. 22, 1991

[51] Int. Cl.[5] .................... B62B 1/14

[52] U.S. Cl. .................... 280/47.19; 220/909; 280/47.26; 280/79.2

[58] Field of Search .................... 280/47.26, 79.2, 47.35, 280/47.19; 220/908, 909

[56] References Cited

U.S. PATENT DOCUMENTS

| | | | |
|---|---|---|---|
| 1,470,254 | 10/1923 | Bishop | 280/79.2 |
| 4,905,853 | 3/1990 | Strawder | 220/909 |
| 5,015,142 | 5/1991 | Carson | 220/909 |
| 5,015,143 | 5/1991 | Carson | 220/909 |
| 5,035,563 | 7/1991 | Mezey | 220/909 |
| 5,044,644 | 9/1991 | Duran et al. | 280/47.35 |
| 5,098,250 | 3/1992 | Carson | 220/909 |

FOREIGN PATENT DOCUMENTS

| | | | |
|---|---|---|---|
| 3608031 | 10/1986 | Fed. Rep. of Germany | 220/908 |
| 3831406 | 3/1990 | Fed. Rep. of Germany | 220/908 |
| 2584051 | 1/1987 | France | 220/908 |
| 2207339 | 2/1989 | United Kingdom | 220/908 |
| 2240914 | 8/1991 | United Kingdom | 220/909 |

*Primary Examiner*—Eric D. Culbreth
*Attorney, Agent, or Firm*—Timothy T. Tyson

[57] ABSTRACT

A waste container (20) having an integral enclosure (30) with multiple compartments (32, 34, 36, 38, and 40) oriented to a pair of non symmetrically located lugs (108,110) is provided. The orientation allows for waste separated by class to be oriented with a waste collection vehicle. A cover (60) having hinged lids (64, 66, 68, 70, 72, and 72') is attached to the enclosure with a hinge (56).

8 Claims, 6 Drawing Sheets

WASTE CONTAINER HAVING ORIENTED COMPARTMENTS

TECHNICAL FIELD

The present invention pertains to waste containers and more particularly, to waste containers having multiple oriented compartments.

BACKGROUND ART

The disposal of waste is inherently linked with environmental and energy concerns. Separation of water into classes such as metal, plastic, paper, glass and biodegradable makes it possible to dispose of waste in a manner beneficial to the environment and to conserve energy through recovery of useful materials for reuse. Many approaches have been developed to achieve this desirable result, including the following patents.

U.S. Pat. No. 3,856,173 to Deane has a rack, a central container in the rack with other containers on each side of the central container and a structure carried by and spaced from the rack for retaining newspapers and the like.

U.S. Pat. No. 4,660,758 to Tavel has four separate cavities opening outwardly, each closed by a door to facilitate the separation and handling of paper, metal, glass and miscellaneous waste products. The paper door includes a slot through which the paper waste products are inserted. A plurality of containers are positioned within the separator receptacle adjacent each door to receive the particular waste product. Baskets are provided for holding the containers.

U.S. Pat. No. 4,821,903 to Hayes has a tubular metal cart accommodating a plurality of bins, a floor portion for bearing most of the weight of the individual bins and a common lid which accommodates the bins.

Other U.S. Patents of interest in the art are U.S. Pat. Nos. 1,018,776 to Hoffman, 1,021,872 to Kingsbury, 2,639,037 to Friend, 3,038,403 to Orelind, 3,145,646 to Levy, 3,800,503 to Maki, 4,084,495 to Paul 4,176,747 to Aho, 4,294,379 to Bard, 4,349,123 to Yang, 4,715,572 to Robbins, 4,721,226 to Yurko, 4,736,915 to Miller and 4,941,653 to Sterner.

DISCLOSURE OF INVENTION

The present invention is directed to a waste container having multiple oriented compartments which allows waste separated by class and stored in the compartments to be moved to corresponding areas of a collection vehicle.

Apparatus in accordance with the invention are characterized by an integral enclosure defining a plurality of compartments accessible from a common end of the enclosure and a means nonsymmetrically located on the container for indicating thereto the orientation of the compartments.

Such apparatus is further characterized by lids covering the compartments and attached to the container in a means allowing them to expose the compartments when the container is inverted.

In a preferred embodiment the enclosure has four compartments arranged radially about a cylindrically shaped center compartment. The cross sectional area of each of the compartments increases with distance from a bottom wall to facilitate the egress of contents. A pair of cylindrical lugs are located nonsymmetrically on the enclosure to identify the orientation of the compartments. A cover is rotatably attached to the enclosure. The cover has hinged lids corresponding to the compartments. The lids have indicia to identify to a user the waste class orientation of the compartments.

The cover and lids associated with the outer compartments have a contour rising to peaks so as to facilitate egress of contents. The lids associated with the central compartment form a horizontal work surface for separation of waste. Wheels and a handle are provided for moving the container.

A yoke for raising and inverting the container for dropping the contents of the compartments onto and through a diverter for egress into corresponding areas of the tank of a collection vehicle is described.

The novel features of the invention are set forth with particularly in the appended claims. The invention will be best understood from the following description when read in conjunction with the accompanying drawings.

MODES FOR CARRYING OUT THE INVENTION

Figure 1:
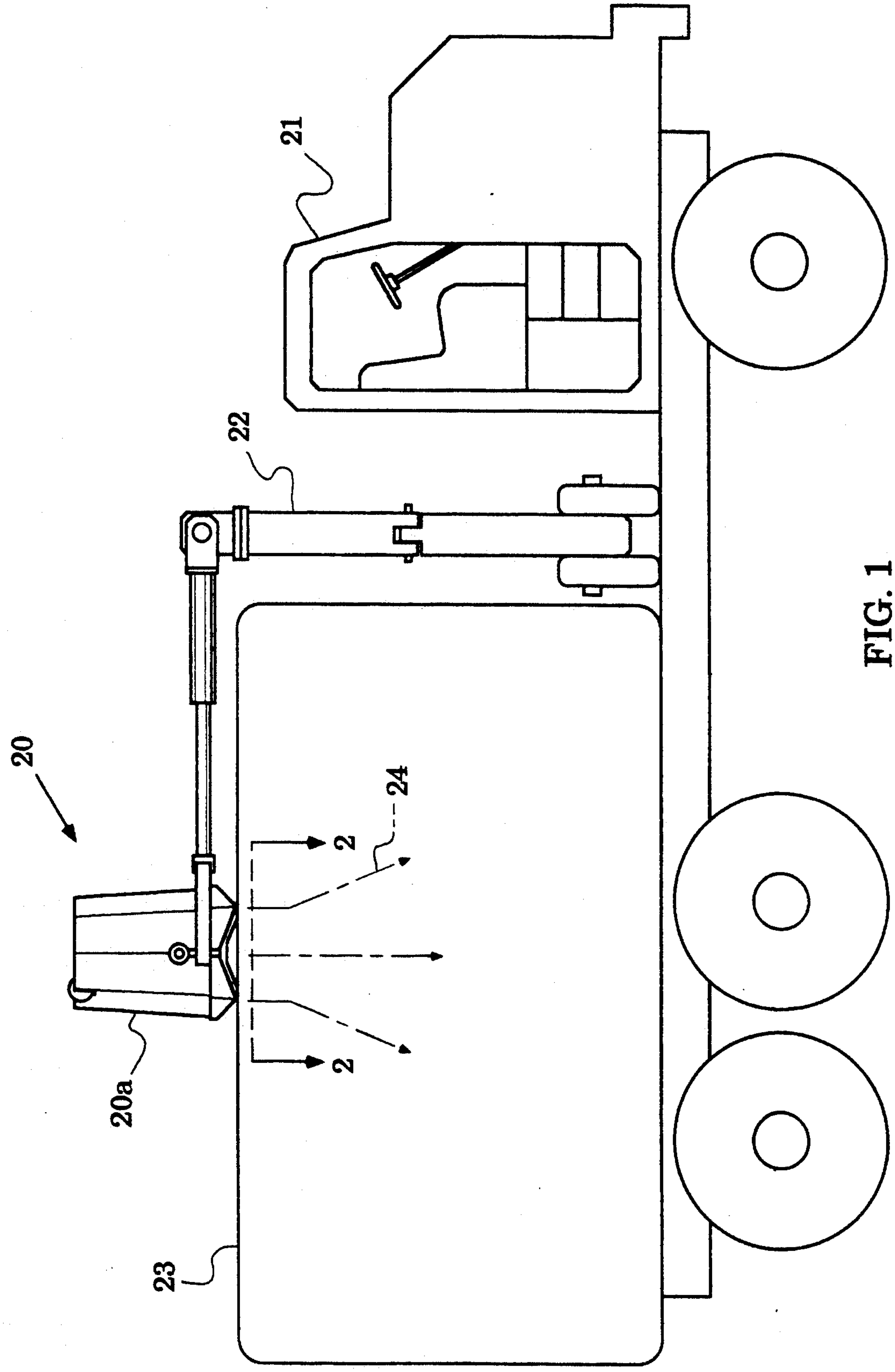
FIG. 1 is an elevation view of a preferred embodiment, in accordance with the present invention, of a waste container mounted on a waste collection vehicle.

FIG. 1 is an elevation view illustrating a preferred embodiment, in accordance with the present invention, of a waste container 20 lifted into a waste removal position 20*a* on a waste collection vehicle 21. The vehicle 21 has an articulated hydraulically powered arm 22 that grasps the container 20 and lifts it to position 20*a* where waste previously sorted by class and stored in corresponding compartments of the container 20 is pulled by gravity into the tank 23. The class separation is maintained by directing the waste to corresponding separate portions of the tank 23 as indicated by the diverging arrows 24.

Figure 2:
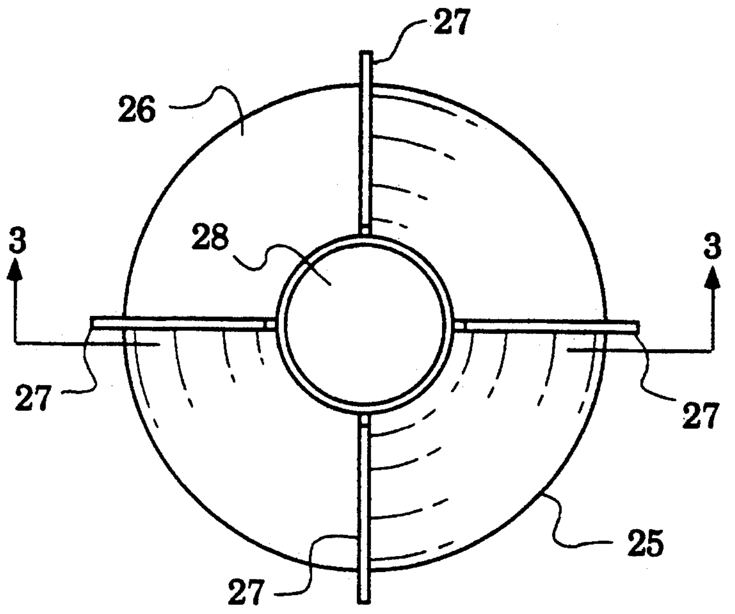
FIG. 2 is a plan view of a diverter in the vehicle of FIG. 1.
Figure 3:
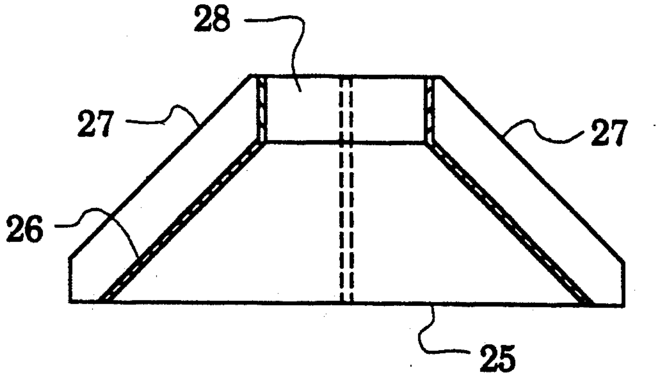
FIG. 3 is a view along the plane 3—3 of FIG. 2.

In the tank 23, the waste from the container 20 drops onto a diverter 25 which is illustrated in FIG. 2 which is a view along the plane 2—2 of FIG. 1 and FIG. 3 which is a view along the plane 3—3 of FIG. 2. In FIGS. 2 and 3 the diverter 25 is seen to have a conical skirt 26 and vanes 27 which separate the surface of the skirt 26 into four regions. Waste is sent along five distinct routes; four along the skirt 26, as divided by the vanes 27, and one down the center aperture 28.

The container 20 is capable of storing waste that has been sorted by class and thus the class separation begun at the container 20 may be maintained in the tank 23 through use of the diverter 25. The vehicle 21 can then take the separated waste to appropriate recycling sites. In this manner waste disposal methods of benefit to the environment can be readily implemented.

Figure 4:
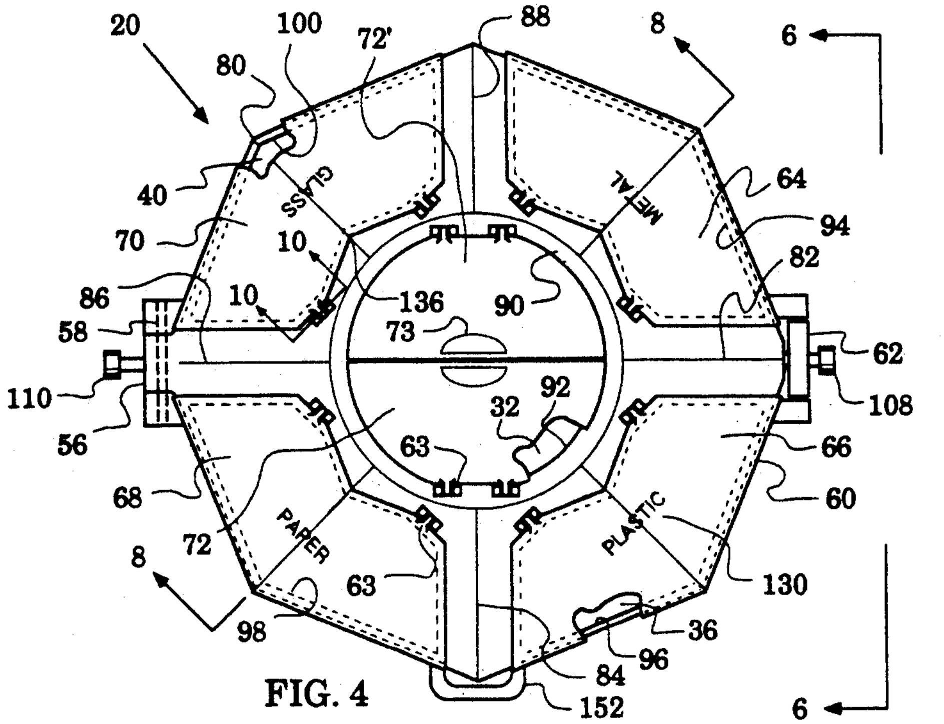
FIG. 4 is a plan view of the waste container of FIG. 1.
Figure 5:
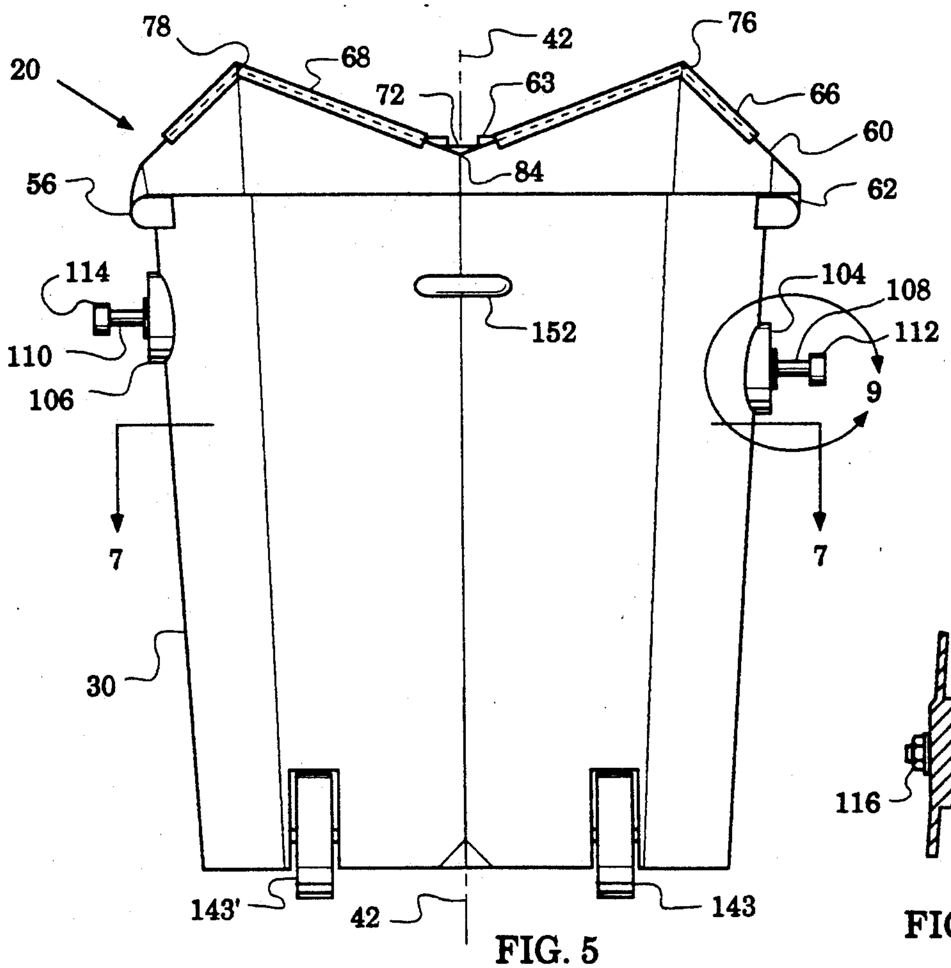
FIG. 5 is an elevation view of the waste container of FIG. 1.
Figure 9:
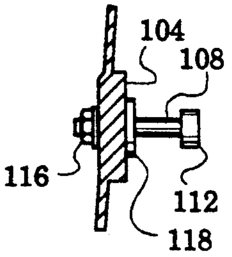
FIG. 9 is an enlarged sectional view of the area enclosed by the line 9 of FIG. 5.
Figure 6:
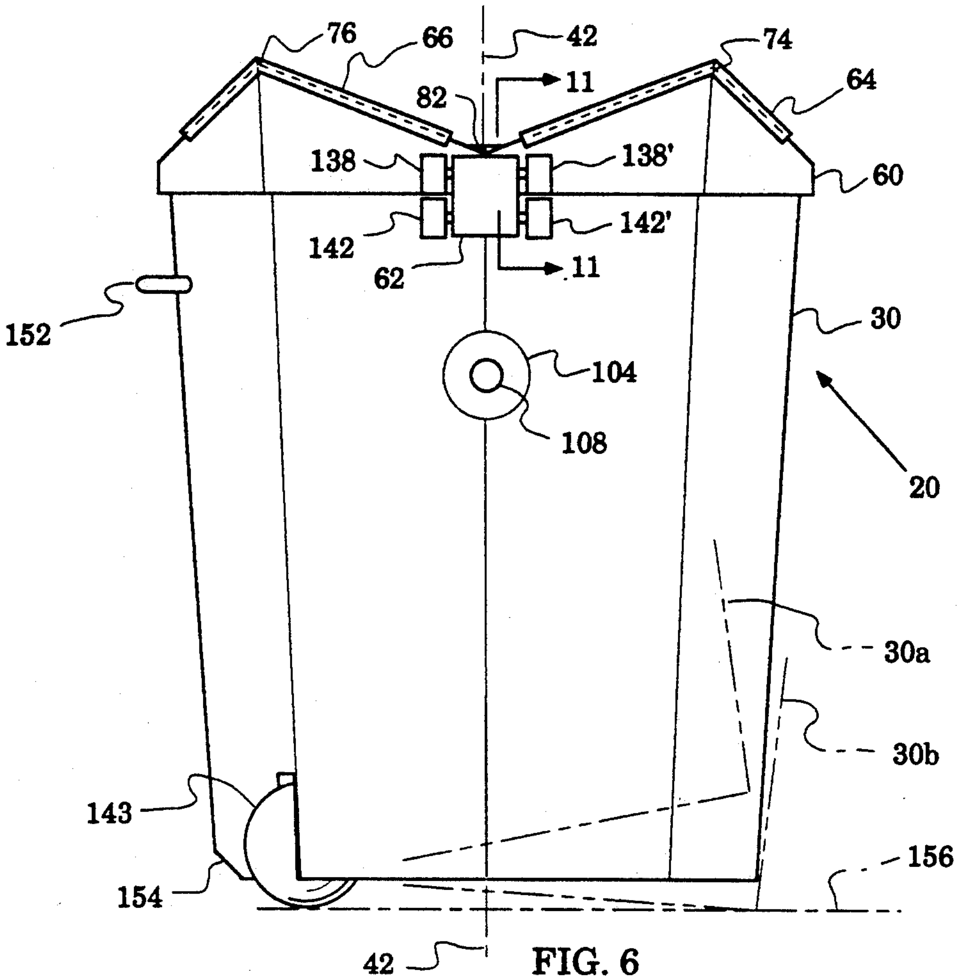
FIG. 6 is a view along the plane 6—6 of FIG. 4.
Figure 7:
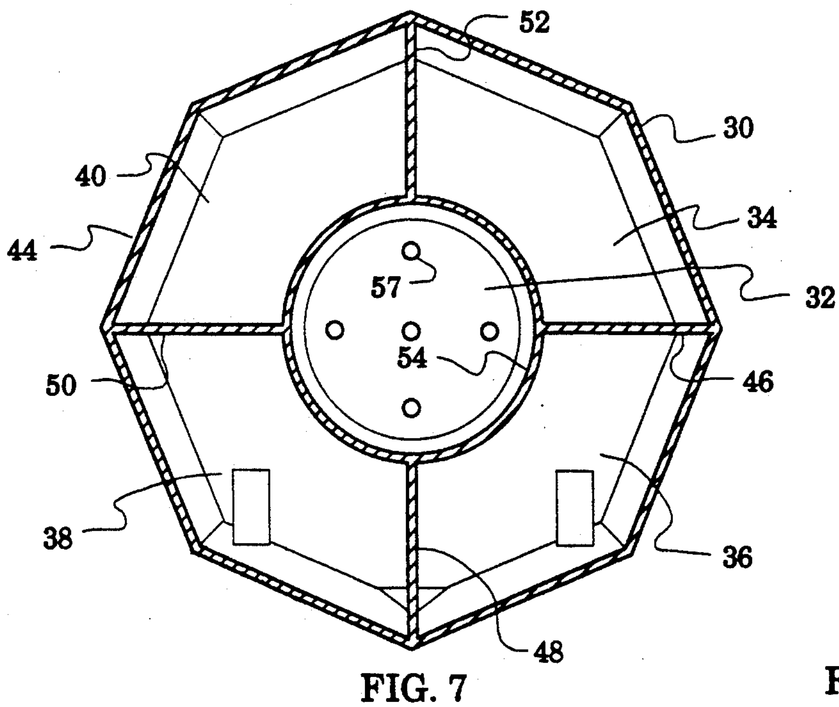
FIG. 7 is a view along the plane 7—7 of FIG. 5.
Figure 11:
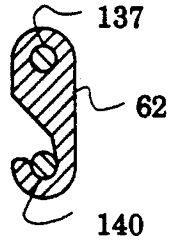
FIG. 11 is a view along the plane 11—11 of FIG. 6.
Figure 8:
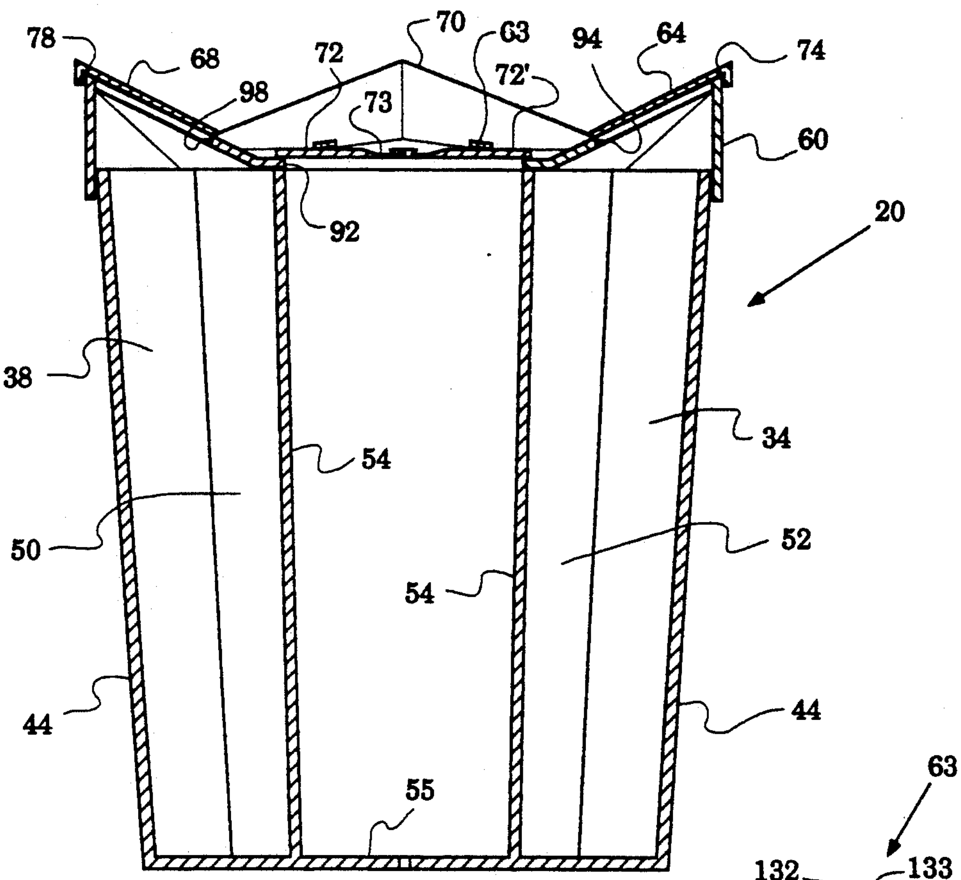
FIG. 8 is a view along the plane 8—8 of FIG. 4.
Figure 10:
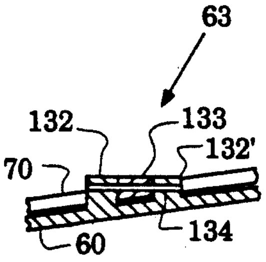
FIG. 10 is a view along the plane 10—10 of FIG. 4.

The details of the waste container 20 will now be disclosed. FIG. 4 is a plan view of the container 20, FIG. 5 is an elevation view of the container 20, FIG. 6 is a view along the plane 6—6 of FIG. 4, FIG. 7 is a sectional view along the plane 7—7 of FIG. 5, FIG. 8 is a view along the plane 8—8 of FIG. 4, FIG. 9 is an enlarged view of the area enclosed by the line 9 of FIG. 5, FIG. 10 is a view along the plane 10—10 of FIG. 4 and FIG. 11 is a view along the plane 11—11 of FIG. 6. FIGS. 4 through 11 illustrate that the container 20 has an integral enclosure 30 which defines a central compartment 32 and four compartments 34, 36, 38 and 40 arranged radially about the compartment 32.

As is most clearly seen in FIG. 7, the compartment 32 has a cylindrical cross section normal to the enclosure longitudinal axis indicated by the phantom line 42 in FIGS. 5 and 6. The outer walls 44 of the enclosure 20 define an octagonal cross section. The compartments 34, 36, 38 and 40 share common radial walls 46, 48, 50 and 52 with their neighbors and the cylindrical wall 54 with the central compartment 32.

Each of the compartments 32, 34, 36, 38 and 40 of the enclosure 30 terminates, opposite the bottom wall 55, in an open end as is best seen in FIG. 8 and are thus all accessible from one end of the container 20. The bottom wall 55 has drainage holes 57 located in the central compartment 32 which is used for bio-degradable waste.

FIG. 8 particularly illustrates that the walls 44 and 54 diverge from the vertical as they progress upward from the bottom wall 55. The wall 44 diverges faster than the wall 54. Thus each cross sectional area, shown in FIG. 7 for the compartments 32, 34, 36, 38 and 40, increases with distance from the bottom wall 55. Waste that has ben sorted and stored in corresponding compartments will thereby egress readily from then when the container 20 is inverted to the position 20*a* shown in FIG. 1.

A hinge 56 utilizing a cylindrical hinge pin 58 rotatably mounts a cover 60 to the enclosure 30. The cover is secured at a side opposite the hinge 56 with a clasp 62. Mounted with hinges 63 to the cover 60 ar lids 64, 66, 68 and 70 which close access to corresponding compartments 34, 36, 38 and 40. Similarly mounted with hinges 63 are lids 72, 72' closing access to the central compartment 32. The lids 72, 72' have recesses 73 to aid in lifting them about their hinges 63. In FIG. 4, lids 66, 70 and 72 are broken away to clearly reveal compartments 36, 40 and 32.

The cover 60 has a contour that rises to peaks 74, 76, 78 and 80 from valleys 82, 84, 86 and 88. A annular lip 90, which the lids 72, 72' abut, lies in the same horizontal plane (when the longitudinal axis 42 is arranged vertically as in FIG. 5) as the valleys 82, 84, 86 and 88. The lids 64, 66, 68 and 70 have a contour corresponding to the portion of the cover 60 underlying them. Each of the lids 64, 66, 68 and 70 also have a descending lip at their outer edge.

Beneath the lids 72, 72', the cover 60 has a circular opening 92 that substantially aligns with the central compartment 32. Around its perimeter the cover 60 has four more openings 94, 96, 98, 100 that lie beneath corresponding lids 64, 66, 68 and 70. The shapes of the openings 94, 96, 98 and 100 in the plan view of FIG. 4 are seen to substantially correspond to the shape of the lids 64, 66, 68 and 70. The openings 94, 96, 98 and 100 substantially align with corresponding compartments 34, 36, 38 and 40.

When the container 20 is in position 20*a* illustrated in FIG. 1 the lids 64, 66, 68, 70, 72 and 72' hang vertically exposing the corresponding openings. Urged by gravity, waste that egresses from the compartments 34, 36, 38 and 40 is channeled by the declining contours of the cover 60 through the openings 94, 96, 98 and 100 while waste in the central compartment 32 egresses readily through the opening 92. The waste therefore passes to the diverter (25 in FIG. 2 and 3) which routes it to corresponding portions of the tank 23 as described above.

Attached to bosses 104, 106 in the walls 44 are a pair of cylindrical lugs 108, 110. The lugs 108, 110 terminate in enlarged stops 112, 114. Along the longitudinal axis (42 in FIG. 5) the lugs 108, 110 are located asymmetrically on the enclosure 30 and thus provide means for indicating, relative thereto, the orientation of the compartments 34, 36, 38 and 40. FIG. 9 particularly illustrates the raised boss 104 and the attachment of lug 108 thereto with conventional hardware 116. In FIG. 9A the lug 108 is seen to have a flange 118 that provides a bearing area against the boss 104. The lug 110 has a similar flange. The lugs 108, 110 also serve as means for lifting the container 20.

Other asymmetrically located means may be used in place of the lugs 108, 110 for indicating orientation thereto of the compartments 34, 36, 38 and 40. For instance indentations in the enclosure wall 44, molded bosses in the wall 44, and molded ribs in the walls 44 may be used.

The orientation of compartments 34, 36, 38 and 40 is indicated to the vehicle 22 of FIG. 1 when it grasps the asymmetric lugs 108, 110. With this orientation known to the vehicle, the sorted waste ends up in the corresponding part of the tank 23 of FIG. 1. To complete the system the user of the container 20 must also be able to identify the corresponding compartments of the container 20. For this reason indicia 130 is provided on the lids 64, 66, 68 and 70 as illustrated in FIG. 4. This indicia may be applied to the surface with a suitable paint or ink or maybe a raised portion of the lid surface. The center compartment 32 is for bio-degradable waste and does not need identification since its orientation is always known.

FIG. 10 particularly illustrates the structure of the hinge 63. Bosses 132, 132' on the cover 60 enclose a similar boss 133 on the lid 70. A hinge pin 134 is pressed through the bosses 132, 132' and 133. It is apparent from FIG. 10 that the lid 70 and cover 60 are slanted relative to the hinge pin 134 because of their contour which was discussed above. To insure that the lid 70 (and similarly lids 64, 66 and 68) swing freely away from the cover 60 the shape of the lid 70 defines a notch 136 as shown in FIG. 4. Thus the lids 64, 66, 68 and 70 can hang vertically as was also discussed above.

FIG. 11 is a view along the plane 11—11 of FIG. 6. FIGS. 6 and 11 illustrate that the clasp 62 rotates on a pin 137 which is supported by bosses 138, 138' of the cover 60. The clasp 62 is of a resilient material which allows it to be pressed over a pin 140 supported by bosses 142, 142' of the enclosure 30. When the clasp 62 is released from the pin 140 the cover 670 can be swung on the hinge 56 to expose the compartments 32, 34, 36, 38 and 40. This can be useful when a mistake has been made in the sorting and storing of waste in the compartments. It is also useful for cleaning of the container 20.

When sorting waste by classes, such as glass, metal, paper, plastic and bio-degradable, the substantially horizontal surface provided by the lids 72, 72' and the annular lip 90 my be used as a work surface. The lids 64, 66, 68, 70, 72, and 72' may then be raised and the waste deposited in the compartment corresponding to each class.

Figure 12:
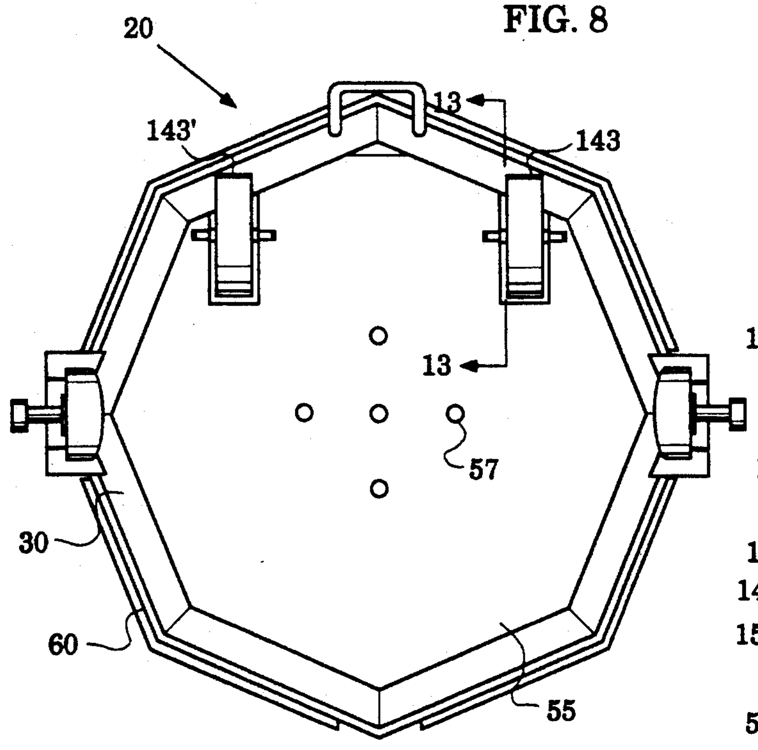
FIG. 12 is a bottom plan view of the waste container of FIG. 1.
Figure 13:
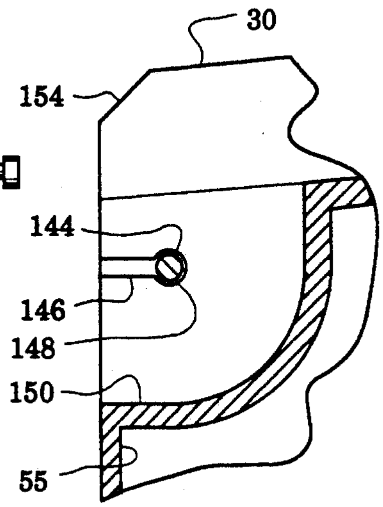
FIG. 13 is a view along the plane 13—13 of FIG. 122.

FIG. 12 is a bottom plan view of the container 20 and FIG. 13 is an enlarged view along the plane 13—13 of FIG. 12. FIGS. 12 and 13 show a pair of wheels 143, 143' rotatably attached with axles in the enclosure bottomwall 55. One axle 144 is shown in FIG. 12 pressed through a narrowed channel 146 that widens to a circular end 148 which receives the axle 144. The bottom wall 55 rises to define a wheel housing 150 to receive the wheel 143.

FIG. 6 shows that a handle 152 is attached to the enclosure 30 so that the container 20 may be moved while supported on the wheels 143, 143'. The enclosure 30 has a chamfer 154, particularly seen in FIG. 13, preventing the enclosure 30 from scraping the ground 156 if it is rotated up to a position shown by the phantom line 30*a* in FIG. 6. When not being moved the enclosure rests on the ground 156 in a position shown by the phantom line 30*b*.

Figure 14:
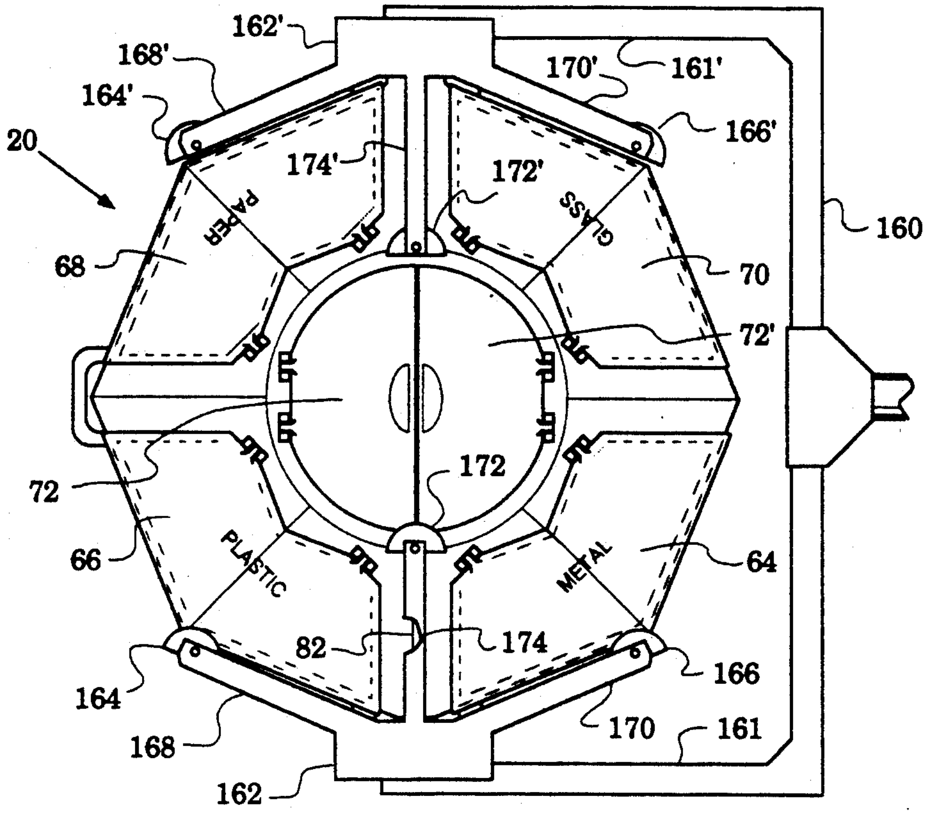
FIG. 14 is a plan view of the container of FIG. 1 in a lifting yoke.
Figure 15:
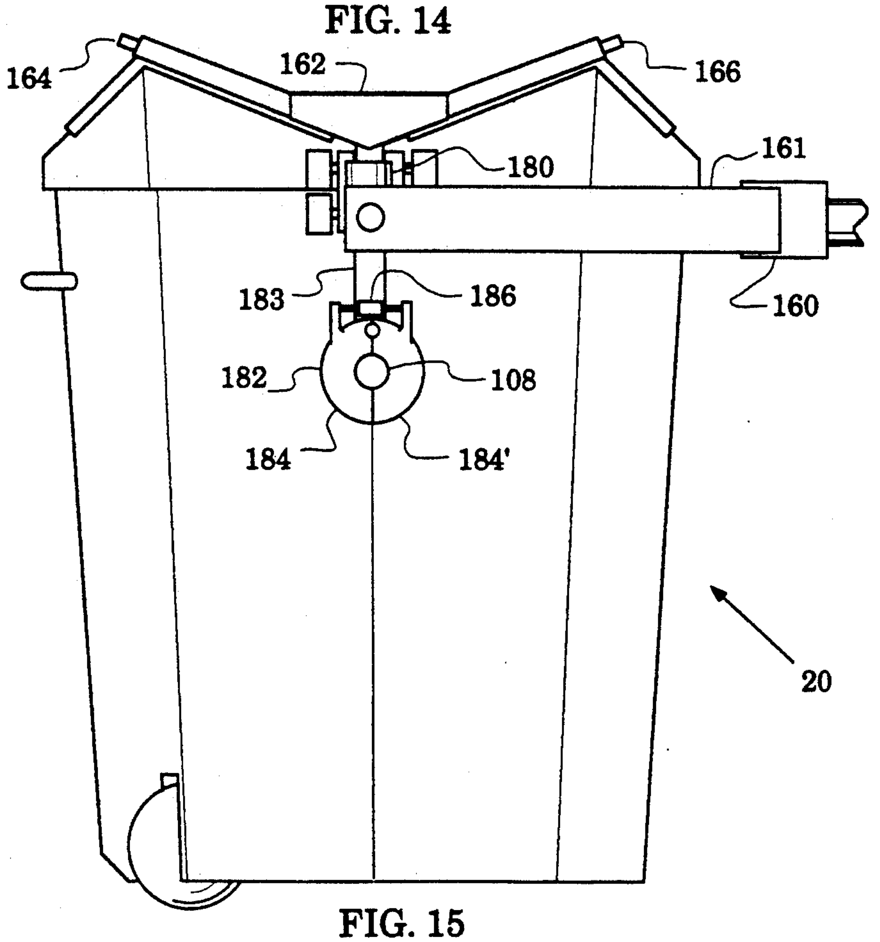
FIG. 15 is an elevation view of FIG. 14.

FIG. 14 is a plan view of the container 20 with a lifting yoke 160 and FIG. 15 is an elevation view of FIG. 14. FIGS. 14 and 15 illustrate that the yoke 160 has a pair of arms 161, 161' that carry retainers 162, 162' at their ends. The retainer 162 is formed to correspond to the contour of the cover 60 and the lids 64 and 66. Half discs 164 and 166 are rotatably mounted at the ends of retainer fingers 168 and 170 while half disc 172 is rotatably mounted at the end of retainer finger 174. The half discs 164 and 166 abut the lids 66 and 64 retaining them in a closed position. The half disc 172 abuts lids 72 and 72' retaining them in a similar closed position.

The retainer 162' is similar to retainer 162 and has corresponding half discs 164', 166' and 172' which are shown in a position 180 degrees opposite from that of their counterparts on the retainer 162. In the half disc open position shown on retainer 162' the lids 68 and 70 are free to wing about their hingers 63. It is apparent that half discs 172 and 172' would both have to be in the position shown for half disc 172' to free lids 72, 72' for swinging about their hinges 63.

The retainer 162 is moved vertically (in FIG. 15) from the arm 161 by a piston 180. A clamp 182 on the end of leg 183, which extends downward from the arm 161, has pincers 184, 184' activated by a piston 186 to grasp the lug 108. A similar clamp on the retainer 162' grasps the asymmetrically located lug (110 in FIG. 5) on the other side of the enclosure 30.

In use the retainer 162 is moved into position, the clamp 182 grasps the lug 108 and the retainer 162 is moved down by the piston 280 to about the channel 82 which is shown beneath a broken away area of finger 174. The retainer 162' is maneuvered similarly. Then the half discs 164, 164', 166, 166', 172 and 172' are set to the closed position (shown with half discs 164, 166 and 172 in FIG. 14). The container 20 may then be lifted to the top of the tank 23 as shown in FIG. 1. The yoke 160 is rotated 180 degrees to place the container in position 20*a* whereupon the half discs are set to the open position. The lids 64, 66, 68, 70, 72 and 72' swing open and waste descends from the compartments of the container 20 to corresponding areas of the tank 23. The half discs 164, 164', 166, 166', 172 and 172' may be operated independently allowing independent closing and opening of lids. For instance, after the container is rotated to position 20*a*, only the half disc 166 could be set to the open position if it were desired to dump only the metal contents of the container 20.

From the foregoing it should now be recognized that a waste container has been disclosed herein defining integral multiple oriented compartments for use in separation, transfer and recovery of classes of waste. Although the present invention has been described with reference to preferred embodiments, numerous modifications and rearrangements can be made with the equivalent result still embraced within the scope of the invention.

What is claimed is:

1. A waste container comprising:

an integral enclosure having a first end and a longitudinal axis, said enclosure defining a plurality of compartments, each of said compartments elongated along said longitudinal axis and having an open end accessible from said first end; and a pair of lugs extending outward from said enclosure and normal to said longitudinal axis, said lugs located asymmetrically relative to said first end for indicating to an apparatus for lifting and emptying said container the orientation of said compartments.

2. A container as defined in claim 1 wherein each of said compartments has a cross sectional area defined normal to said longitudinal axis decreasing with distance from said open end to facilitate egress of contents of said compartments.

3. A container as defined in claim 1 wherein said plurality of compartments comprise:

a central compartment having a circular cross section; and at least two outer compartments arranged radially about said central compartment.

4. A container as defined in claim 3 wherein lids corresponding to said central compartment lie in a plane normal to said longitudinal axis to form a work surface for sorting for sorting of waste.

5. A container as defined in claim 1 wherein the contour of sid cover and lids corresponding to said outer compartments rise to peaks oriented towards said first end.

6. A container as defined in claim 3 further comprising:

a cover over said first end, said cover having a plurality of openings wherein each of said openings exposes the open end of a corresponding one of sid compartments; and hinge means for mounting said cover on said enclosure.

7. A container as defined in claim 6 further comprising:

a plurality of lids wherein each of said lids is associated with and closes at least a portion of a corresponding one of sid openings; and means, responsive to gravity, for attaching each of said lids to said container wherein each of said lids exposes its associated one of said openings when said longitudinal axis is substantially vertical and said first end is substantially lower than the remainder of said enclosure.

8. A waste container, comprising:

an integral enclosure having a first end and a longitudinal axis, said enclosure defining a plurality of compartments, each of said compartments elongated along said longitudinal axis and having an open end accessible from said first end, each of said compartments having a cross sectional area defined normal to said longitudinal axis decreasing with distance from said open end, said plurality of compartments including a central compartment having a cylindrical cross section and at least two outer compartments arranged radially about said central compartment;

means, available to an apparatus for lifting and emptying said container, for indicating the orientation thereto of said compartments;

a cover over said first end, said cover having a plurality of openings wherein each of said openings exposes said open end of a corresponding one of said compartments;

hinge means for mounting said cover on said enclosure;

a plurality of lids wherein each of said lids is associated with and closes at least a portion of a corresponding one of said openings; and means, responsive to gravity, for attaching each of said lids to said cover wherein each of said lids exposes said associated open end when said longitudinal axis is substantially vertical and said first end is substantially lower than the remainder of said enclosure;

and wherein the lids corresponding to said central compartment lie in a plane substantially normal to said longitudinal axis to form a work surface for sorting of waste when said longitudinal axis is substantially vertical;

and wherein the contours of said cover and the lids corresponding to said outer compartments rise to peaks oriented towards said first end.

* * * * *